(12) United States Patent
Su et al.

(10) Patent No.: US 7,983,204 B2
(45) Date of Patent: Jul. 19, 2011

(54) WIRELESSS COMMUNICATION DEVICE AND METHOD

(75) Inventors: Li Su, Grayslake, IL (US); Feng Qian, Buffalo Grove, IL (US); Brett L Robertson, Mundelein, IL (US); Brian D Storm, Round Lake Beach, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 863 days.

(21) Appl. No.: 11/945,373

(22) Filed: Nov. 27, 2007

(65) Prior Publication Data

US 2009/0135752 A1 May 28, 2009

(51) Int. Cl.
G08C 17/00 (2006.01)
H04B 1/16 (2006.01)

(52) U.S. Cl. ..................... 370/311; 455/343.2
(58) Field of Classification Search .......... None
See application file for complete search history.

(56) References Cited

U.S. PATENT DOCUMENTS

| | | | |
|---|---|---|---|
| 6,807,227 B2 * | 10/2004 | Chien | 375/224 |
| 7,474,887 B2 * | 1/2009 | Chandra et al. | 455/343.2 |
| 2004/0029575 A1 * | 2/2004 | Mehta | 455/419 |
| 2004/0153679 A1 * | 8/2004 | Fitton et al. | 713/322 |
| 2005/0152322 A1 * | 7/2005 | Dolwin et al. | 370/338 |
| 2007/0049238 A1 * | 3/2007 | Chen | 455/343.1 |
| 2008/0307240 A1 * | 12/2008 | Dahan et al. | 713/320 |

FOREIGN PATENT DOCUMENTS

| | | |
|---|---|---|
| EP | 0924947 A1 | 6/1999 |
| GB | 2410652 A | 8/2005 |
| WO | 2007084045 A1 | 7/2007 |

OTHER PUBLICATIONS

PCT International Search Report and Written Opinion; dated Jan. 4, 2009; PCT/US2008/081705.

* cited by examiner

*Primary Examiner* — Steven H Nguyen
(74) *Attorney, Agent, or Firm* — Gary J. Cunningham

(57) ABSTRACT

A wireless communication device (200), including: a housing (210); a controller (220), the controller (220) configured to control the operations of the wireless communication device; memory (270) coupled to the controller (220); a transceiver (250) coupled to the controller (220), the transceiver (250) configured to send and receive wireless signals; the receive signal includes at least a control channel and a packet data channel, the control channel being configured to provide the modulation and encoding and/or decoding information necessary to process a subsequent packet of data received by the transceiver (250) or in preparation for transmission by the transceiver (250); a monitoring module (290) for monitoring the control channel and controlling a dynamic scaling module (295), the monitoring module (290) reads a parameter field from the control channel which is used to determine that the data message has certain processing needs meeting a certain threshold; the dynamic scaling module (295) is configured to provide energy savings by varying the voltage and frequency of a controller, substantially real-time, according to processing needs, including: (i) a performance mode when the certain threshold is met; and (ii) a default mode when the certain threshold is not met.

19 Claims, 7 Drawing Sheets

WIRELESSS COMMUNICATION DEVICE AND METHOD

BACKGROUND

1. Field

The present disclosure is directed to a wireless communication device and method.

2. Introduction

User's are demanding wireless communication devices and methods capable of decoding the highest data rate possible. Presently known methods either maintain the voltage and frequency at levels required to support high data rates, generally all of the time, or use long term averaging methods to scale voltage and frequency at a slow rate. These devices provide minimal improvement, while leaving significant current drain savings unaddressed.

There is a need to aggressively utilize dynamic voltage and frequency scaling (DVFS) in wireless communication applications, to maximize battery life.

More particularly, there is a need to aggressively utilize dynamic voltage and frequency scaling (DVFS) in wireless communication applications, for example, for use in packet communication applications.

Thus, there is a need for a method and device for prolonging battery life in battery operated wireless applications.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
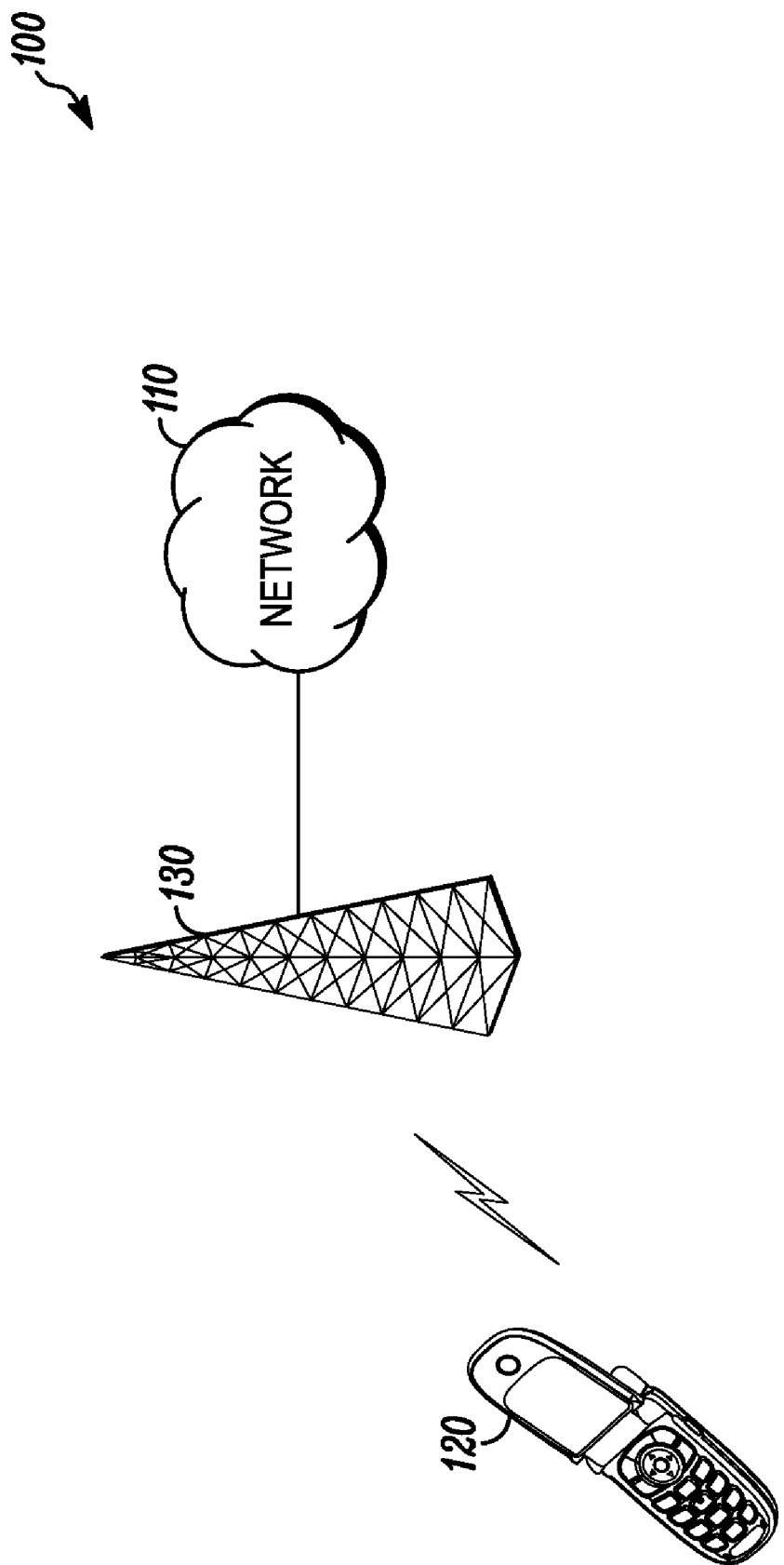
FIG. 1 is an exemplary block diagram of a system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a General Packet Radio System (GPRS) network, a Enhanced Data rates for GSM Evolution (EDGE) network, a Third Generation (3G) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130.

Figure 2:
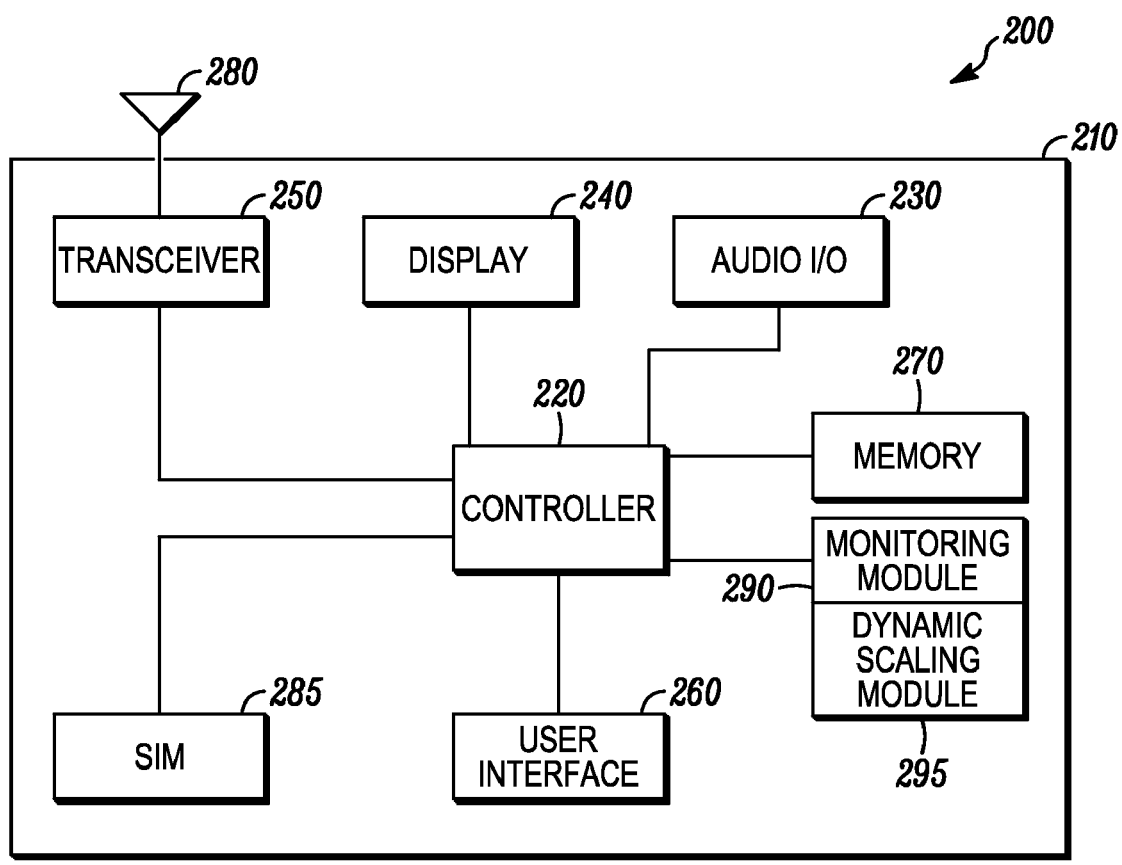
FIG. 2 is an exemplary block diagram of a wireless communication device according to one embodiment.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the controller 220, data input and output circuitry 235 coupled to the controller 220, a display 240 coupled to the controller 220, a transceiver 250 coupled to the controller 220, a user interface 260 coupled to the controller 220, a memory 270 coupled to the controller 220, a transceiver 250 coupled to the controller 220 and an antenna 280 coupled to the transceiver 250. The wireless communication device 200 also includes a monitoring module 290 and a dynamic scaling module 295, which are coupled to the controller 220. In more detail, they can reside within the controller 220, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The data input and/or output circuitry 235 can include, for example, a USB, UART, SDIO, Infrared or other serial and/or parallel ports which communicate with cabled or local devices such as personal computers or memory storage cards. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

Figure 4A:
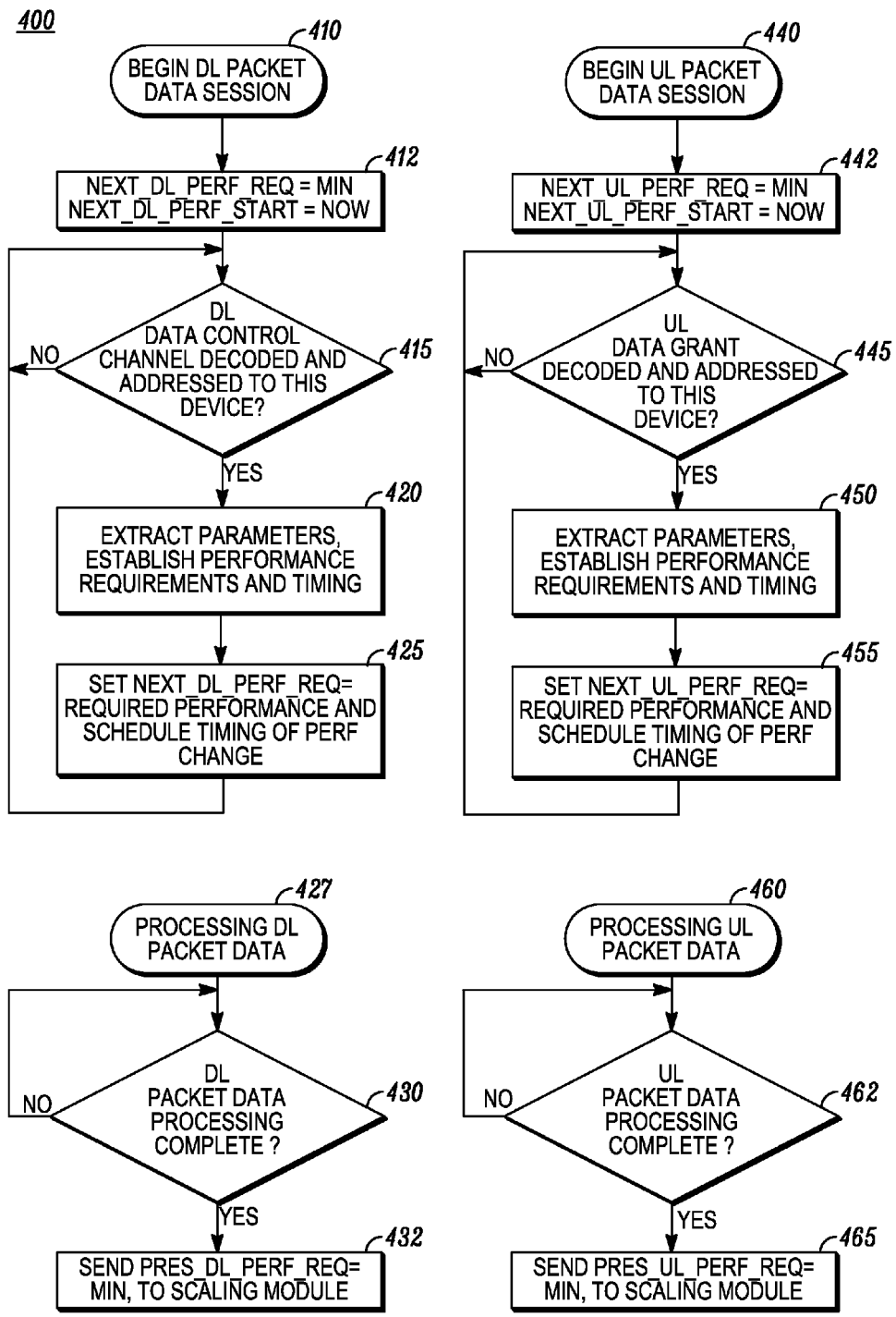
FIG. 4 is an exemplary flowchart illustrating the operation of a wireless communication device according to another embodiment.
Figure 4B:
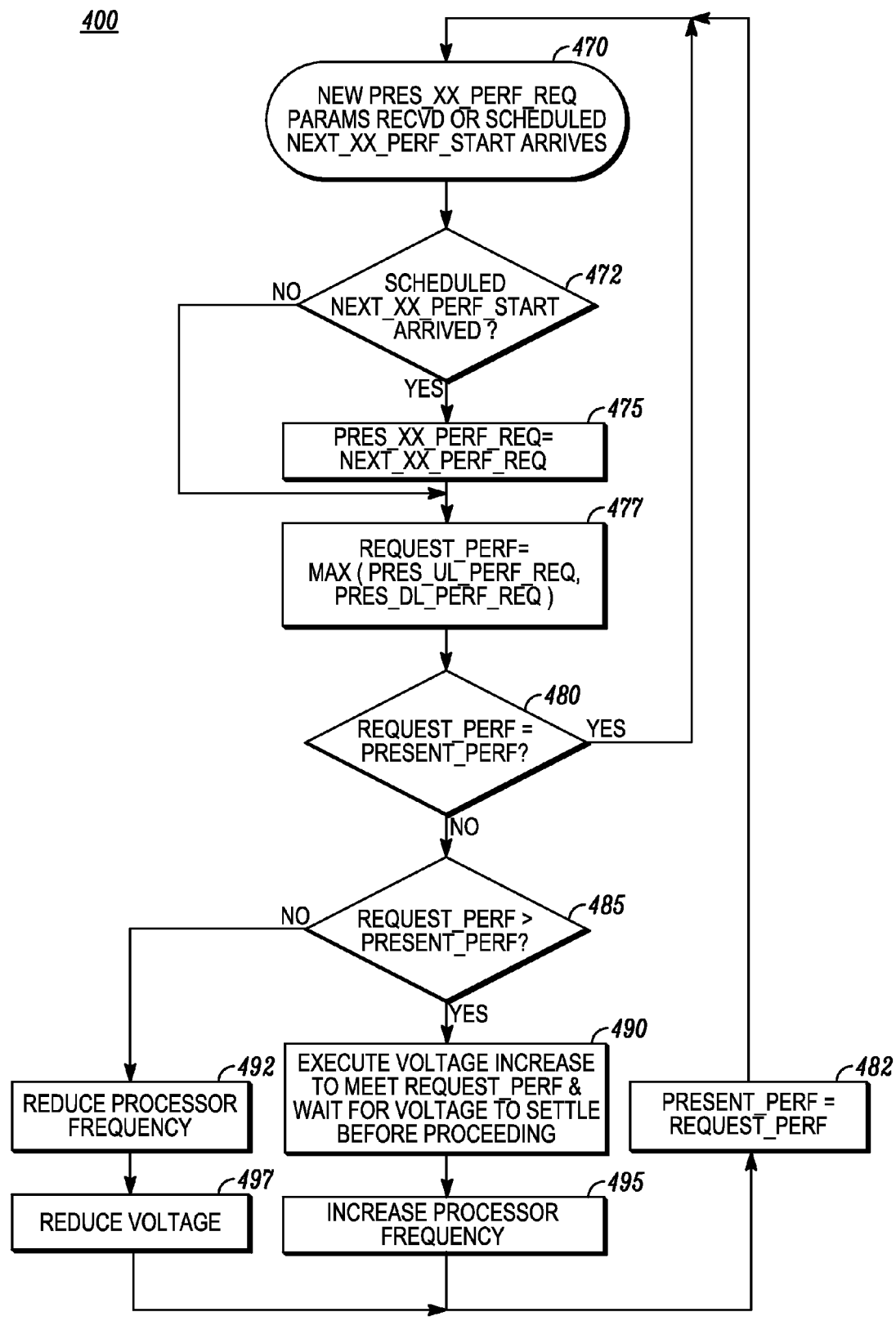
Figure 5:
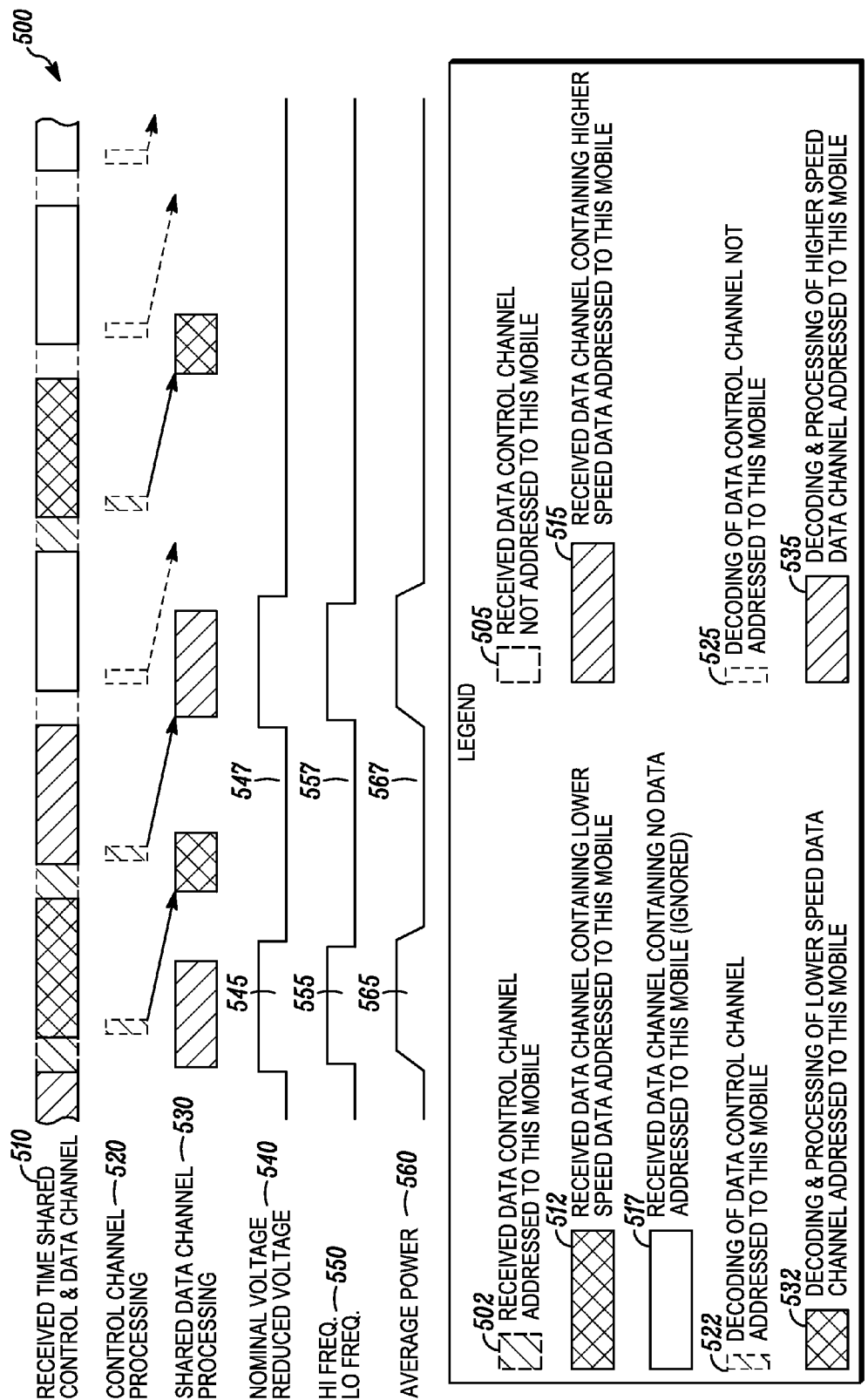
FIG. 5 is an exemplary timing diagram outlining the operation of wireless communication device according to another embodiment.

In more detail, the wireless communication device 200 shown in FIG. 2, includes: a housing 210; a controller 220 coupled to the housing 210, the controller 220 configured to control the operations of the wireless communication device; memory 270 coupled to the controller 220; a transceiver 250 coupled to the controller 220, the transceiver 250 configured to send and receive wireless signals; the receive signal includes at least a control channel and a packet data channel (as best shown in FIGS. 4 and 5), the control channel being configured to provide a means to convey if a subsequent associated packet data channel contains data intended for this unit, and if so, the modulation and decoding information necessary to process a subsequent packet of data received by the transceiver; a monitoring module 290 for monitoring the control channel and controlling a dynamic scaling module 295, the monitoring module 290 reads a parameter field from the control channel which is used to determine that the data message has certain processing needs meeting a certain threshold; the dynamic scaling module 295 is configured to provide energy savings by varying the voltage and/or frequency of a controller, substantially real-time, according to processing needs, including: (i) a performance mode including a performance voltage and/or performance frequency when the certain threshold is met; and (ii) a default mode including a default voltage and/or default frequency when the certain threshold is not met.

User's are increasingly demanding a transceiver capable of decoding the highest data rate possible based on its reported capabilities. Presently known methods either maintain the voltage and frequency at levels required to support these highest data rate, generally all of the time, or use long term averaging methods to scale voltage and frequency at a slow rate, which offers some minimal improvement while leaving significant current drain savings untapped.

The disclosed device and method 200 and 300 provides an aggressive utilization of DVFS (Dynamic Voltage & Frequency Scaling), and thus contributes to maximizing the battery life while in packet data modes. The monitoring and scaling modules contribute to ensure that adequate performance is available for many possible scenarios, while minimizing periods of excess performance.

The wireless communication device and method 200 and 300 is particularly adapted for use in packet communication applications, in which information is provided in advance of or during the reception of a data packet on another logical or physical channel, which conveys information that can be used to pre-determine the processing, such as, the processing requirements for an associated data packet, as detailed herein.

Prior art has not been capable of supporting such an aggressive method without resulting in performance shortfalls which forced the algorithm to operate in a manner where excess performance and wasted current drain is common rather than an exception.

In one embodiment, the control channel provides, a means to convey if a subsequent packet data channel is intended for this unit, and if so, a plurality of parameters required to demodulate, decode and combine subsequent shared packet data channel information and/or data. In a preferred embodiment, these parameters are used to establish the amount of data being sent in a subsequent packet data channel and the steps required to process this data.

In a second embodiment, the control channel provides an uplink grant to allow the mobile to transmit and encode data. These parameters combined with the knowledge of the amount of data waiting to be sent can also be used to establish the amount of data to be sent in the upcoming packet and predict the amount of additional processing required to send this data.

In more detail, in the first embodiment detailed immediately above, can use a plurality of parameters or a number of codes to despread, designate the modulation type, provide the redundancy information, ARQ process number and transmission/retransmission indicator.

As background, the terms used herein have their ordinary meaning in the art. The following brief definitions are provided for clarity. For a WCDMA transceiver, the network can send data on one or more despreading codes and or different types of modulation requiring the receiver to be configured to correctly demodulate and despread the received signal so that all of the data intended for this receiver are available. Redundancy information conveys how to decode and combine this packet with previously received traffic. ARQ (Automatic Repeat request) process numbers or data convey the process this packet's data belongs to. The transmission/retransmission indicator conveys whether the arriving data is a retransmission and whether it is to be combined with prior traffic or if the buffer filled with prior data should be flushed before filling with this data.

In connection with the second embodiment detailed above, it can use a plurality of parameters including but not limited to, presence of an uplink grant, allowed transmit power, current transmit power, and maximum transmit power. The mobile can determine the amount of additional data that can be sent based on the presence of the grant from the network and the amount of additional transmit power allowed by the network.

In a preferred embodiment, a shared packet data channel is processed based on a received plurality of parameters on an associated control channel. In one instance, the packet data channel may be completely ignored if there is no data traffic in an associated subsequent data channel. This information can be conveyed in numerous ways, for example, including utilization of a masking operation which causes the control channel to fail a CRC (Cyclic Redundancy Code) if not intended for this device or a bit field within the body of the received control channel message. In a second instance, when the control channel conveys that a subsequent packet data channel is intended for a device, the location in time of the associated data channel may be fixed relative to the control channel or defined within the control channel content. Prior to the start of the reception of the data channel, the receiver is configured with the demodulation and despreading parameters to enable reception of the soft symbols intended for this device. The decoding, combining and handling information is then utilized to process these soft symbols correctly in order to deliver raw data to its final destination.

The transceiver 250 is particularly adapted and configured to send and receive wireless signals communicating with packet data applications. Some examples can include, and are not limited to, WCDMA packet data on dedicated channels where the TFCI (transport format combination index) is decoded prior to the DPDCH (downlink physical data channel) and indicates the amount of data to be decoded; GSM and (E)GPRS, wherein stealing flags indicate the type of data channel that need to be decoded prior to decoding the slot of data to perform the correct depuncturing/decoding. The number of slots are generally known, so between these two pieces of information, one can predict the amount of MIPS required to decode this amount of data and adapt the performance available to meet the need. Additionally, the USF (uplink state flag, sent DL every ~20 ms) will also require additional MIPS as it allows the mobile to begin transmit and can be used to drive changes in operating voltage/frequency; and 3GPP Long Term Evolution, wherein the PDCCH (physical downlink control channel) encodes the downlink assignment, which include a number of sub-carriers, a number of slots, a modulation scheme, a transport block size, and precedes the decoding of DL-SCH (downlink shared transport channel) by around 751 us.

In a preferred embodiment, the transceiver is configured to send and receive wireless signals including at least one of EDGE, CDMA DO (Data Only), HSDPA (High Speed Downlink Packet Access), 3GPP LTE (Long Term Evolution) and WiMAX (Worldwide interoperability for Microwave Access). These radio access technologies support packet data connections in which a control channel is associated with a subsequent packet data channel allowing clear and specific knowledge of the upcoming processing load to be known, thereby allowing the disclosed aggressive DVFS approach to be applied in device and method 200 and 300, respectively.

In connection with the performance mode, the operating voltages are generally sufficient to process control channels with high throughput packet data channels and frequencies necessary to meet high performance requirements. In one embodiment, the performance voltage is about 1.6 v and the performance frequency is about 250 Mhz. and the default voltage is about 1.2 v and the default frequency is about 208 Mhz. Advantageously, this provides energy savings by providing lower voltage as a default and higher voltage only when necessary, resulting in longer useful battery life. As should be understood by those skilled in the art, the performance voltages, as well as the number of voltage steps and frequencies, as well as the number of frequency steps can vary by application, and above specified ones are exemplary.

Turning now to the subject of a "certain threshold" in the context of the device and method 200 and 300, as should be understood by those skilled in the art, such certain threshold can very greatly. In an embodiment, the device and method 200 and 300 are adapted and configured to allow the controller 220 to process certain streaming audio and video bursts while remaining in the default mode, thus prolonging battery life. Additionally, the default operating mode can be defined such that typical fixed-rate processing (transparent audio/video, certain streaming applications) are selected to operate without requiring the higher performance mode, thus requiring lower current.

In one embodiment, the dynamic scaling module 295 can include at least a third mode including a third voltage and third frequency when a predetermined threshold is met. In this embodiment, three power modes are disclosed, such as a low power mode, normal power mode and high power mode, each with a corresponding voltage and frequency. For example, when only monitoring the control channel but no data is received, the low power mode is used; when a low data rate is being sent or received, the normal power mode can be utilized and when a high data rate is sent or received, the high power mode can be used. In this application, the thresholds can be determined, for example, by profiling the application, and these thresholds will change based on the type of processor and hardware acceleration used in the data paths.

Also in one embodiment, the dynamic scaling module 295 remains in at least one of the performance mode and default mode for at least two successive parameter field readings before switching.

Figure 3:
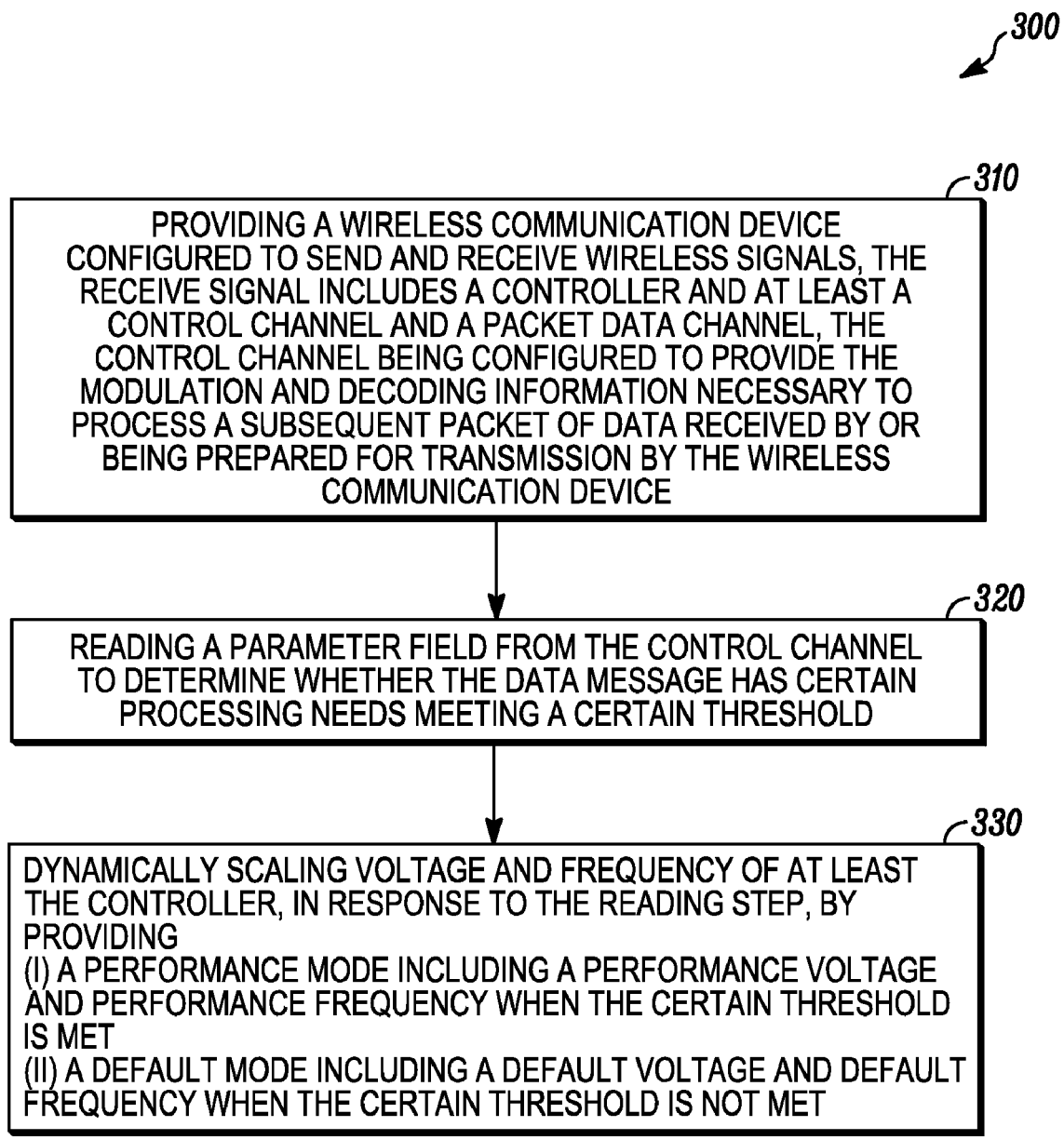
FIG. 3 is an exemplary block diagram of a wireless communication according to one embodiment.

FIG. 3 is an exemplary block diagram of a wireless communication method 300, according to one embodiment. In its simplest form, it can include: providing 310 a wireless communication device configured to send and receive wireless signals, the receive signal includes a controller and at least a control channel and a packet data channel, the control channel being configured to provide the modulation and decoding information necessary to process a subsequent packet of data received by the wireless communication device; reading 320 a parameter field from the control channel to determine whether the data message has certain processing needs meeting a certain threshold; dynamically scaling 330 voltage and frequency of at least the controller, in response to the reading step, by providing: (i) a performance mode including a performance voltage and performance frequency when the certain threshold is met; and (ii) a default mode including a default voltage and default frequency when the certain threshold is not met. Advantageously, this provides an aggressive method for minimizing current drain, as detailed previously.

In one embodiment, the dynamically scaling step 330 includes remaining in at least one of the performance mode and default mode, using the current and a possible plurality of historical readings of the parameter field before switching. In a preferred embodiment, it can compare the current measurement to a threshold, and if a measurement exceeds the threshold, then the performance mode is selected for a set period of time.

In more detail, in a preferred embodiment the reading step 320 can include providing a plurality of parameters required to demodulate, decode and combine subsequent shared packet data channels, for improved efficiencies. For example, for HSDPA, the parameters can include a number of channelization codes, modulation scheme, transport block size, HARQ transmission/re-transmission flag, redundancy version, etc.; and for 3GPP Long Term Evolution, the parameters can include number of sub-carriers, number of slots, transport block size, modulation schemes, HARQ transmission/re-transmission flag, redundancy version, etc. To limit mode switching ping-pong scenarios, hysterias can be used to make lower performance mode harder to increase performance mode, the hysteresis can be static or dynamic based on historic data.

FIG. 4 is an exemplary flowchart 400 illustrating the operation of the wireless communication method 300 according to one embodiment. When a Downlink (DL) 410 data session is initiated, the next DL_perf_start and DL_perf_start parameters are initialized 412 to minimum (min) and now, respectively. Likewise, when an uplink (UL) 440 data session is initiated, the next UL_perf_start and UL_perf_start parameters are initialized 442 to minimum (min) and now, respectively. The next_xx_perf_req parameters, where xx is either UL or DL, are used to schedule the necessary performance at some point in the near future for the UL and DL packet channel processing. The next_xx_perf_start parameter provides the time when the performance specified by the next_xx_perf_req must be available. Each time a DL control channel or UL grant decode is attempted 415 or 445, the decode will be successful only if that particular message is addressed to that device or the addressed device falls within its group. If the decode fails, no performance change is required for the subsequent associated packet data channel because it is not intended for this device and therefore, the task does nothing further except to resume waiting for the next control or grant channel decode. When a decode is successful, the parameters from the decoded message are extracted to establish the required performance for the subsequent DL 420 associated packet data channel or for the UL 450 associated packet data channel. Once determined, the performance parameter for either the DL 425 or the UL 455 is assigned to the next_xx_perf_req variable and the required time when this performance level must be attained is assigned to next_xx_perf_start. The scheduler then schedules a performance review at (next_xx_perf_start-voltage transition time-frequency transition time). The voltage and frequency transition times account for the time it takes for the voltage and frequency to shift from the present value to the requested value. Once scheduling is complete, this task resumes waiting for the next valid decode.

When a scheduled performance review occurs or a pres_xx_perf_req parameter is updated 470, if the task was triggered as a result of a scheduled performance review 472, the next_xx_perf_req associated with this scheduled event is assigned to the pres_xx_perf_req 475. The pres_xx_perf_req parameters, where xx again is either UL or DL, are used to maintain the present processing requirements. At this point, both the UL and DL present requirements are up to date and the requested performance for the present instant in time is the maximum of pres_UL_perf_req or pres_DL_perf_req 477 which is assigned to request_perf. If the present_perf is already at this level 480, make no adjustments and return to wait for the next pres_xx_perf_req update or scheduled performance review. Otherwise if request_perf>present_perf 485, a performance increase is required and a voltage increase is initiated 490. Once the voltage has settled, the frequency can be increased 495. Else, or answer is "no" in decision box 485, the request_perf<present_perf, and the performance can be decreased so the frequency can be reduced 492 followed by a reduction in voltage 497. While adjusting both frequency and voltage provides the greater current drain savings, it is also possible to adjust the frequency and not the voltage, as should be appreciated by those skilled in the art. Once the change has been made, request_perf is assigned to the present_perf parameter 482.

When an UL or DL packet data channel is actively being processed, the appropriate task, reference number 427 for DL and 460 for UL, respectively, are started and upon completion 430 and 462, the appropriate pres_DL_perf_req or pres_UL_perf_req parameter is set to minimum which will in turn trigger a performance review 470. These procedures continue until both the UL and DL packet data sessions end.

FIG. 5 is an exemplary timing diagram 500 outlining the operation of wireless communication device according to one embodiment. Timing diagram 510 illustrates a time shared control and packet data channel in which two types of data control channels are received: those addressed to this device 502 and those not addressed to this device 505 as shown in the drawing legend; and three types of received data packets: a data packet with lower performance processing requirements 512, a data packet with higher performance processing requirements 515 and a data packet not addressed to this device which does not need to be processed at all 517. Timing diagram 520 illustrates the timing of processing for the shared control channel in which both control messages addressed to this device are processed 522 and control messages not addressed to this device are at least attempted to be processed 525.

Timing diagram 530 illustrates the processing of the subsequent packet data channel based on the extracted parameters from the associated control channel message. These decoding parameters convey in this example, lower processing requirements for certain data packets 532 and higher processing requirements for others 535.

Timing diagram 540 depicts the voltage scaling available to deliver the optimum performance/power tradeoff to process data packets 535 which require higher performance and in this example, higher voltage 545 while allowing the performance to remain low to process data packets 532 which require lower performance with lower voltage 547.

Likewise, timing diagram 550 shows the corresponding frequency adjustments with a higher frequency 555 enabled by the corresponding higher voltage 545 and inversely, the lower frequency 557 which in turn allows the voltage to be lowered 547 to match the lower performance requirements.

The net result is shown in timing diagram 560 which illustrates average power over time with highest power consumed during high performance periods when both frequency 555 and voltage 545 are elevated and lowest power 567 during low performance periods when both frequency 557 and voltage 547 can be reduced. While this figure illustrates changing frequency and voltage together every time. Similarly, these need not be coupled and only two performance levels are shown here for simplicity. An actual system or implementation, can have more than two performance levels and multiple combinations of voltages and frequencies, as should be appreciated by those skilled in the art.

Figure 6:
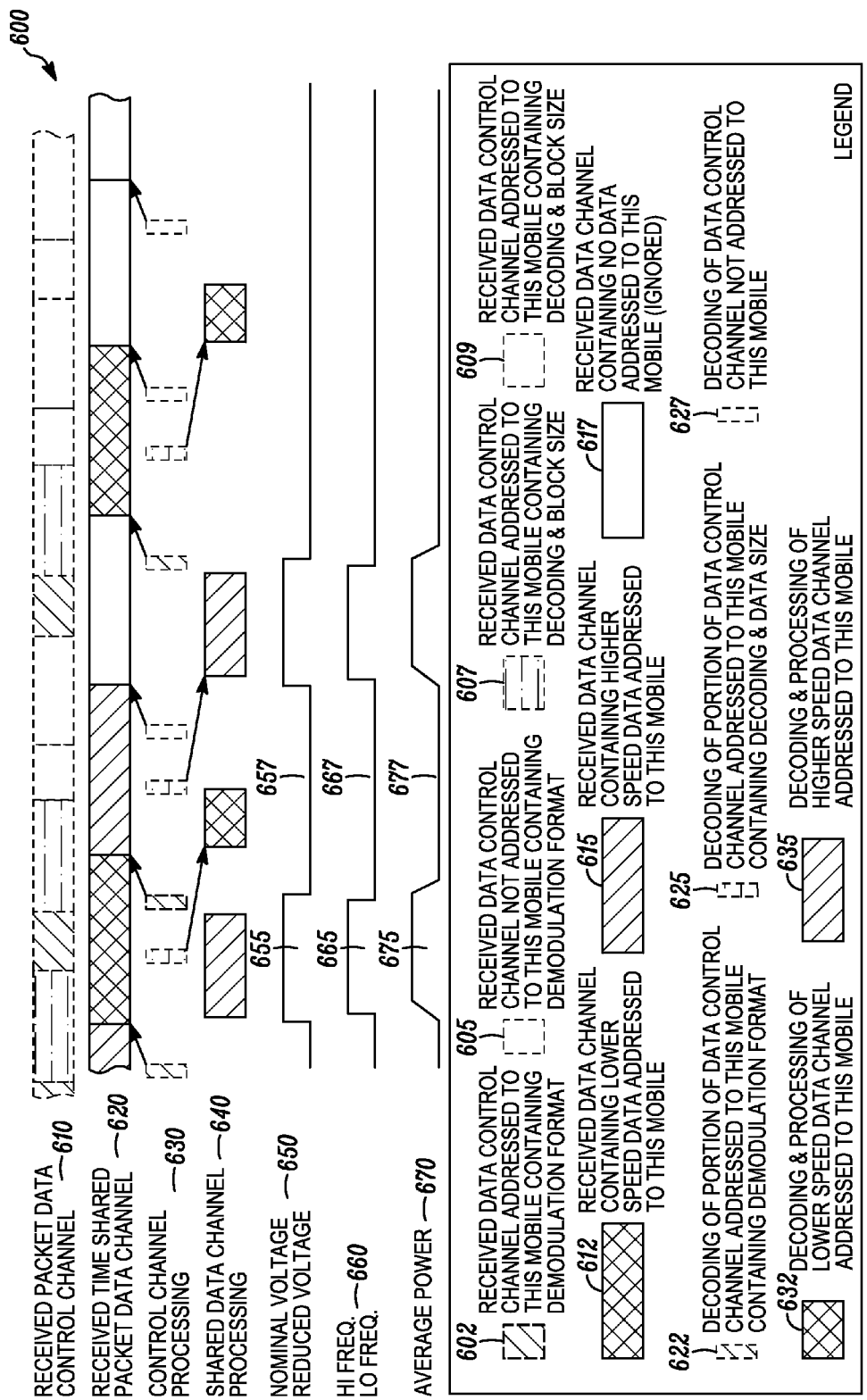
FIG. 6 is an exemplary timing diagram outlining the operation of wireless communication device according to another embodiment.

FIG. 6 is an exemplary timing diagram 600 outlining the operation of wireless communication device according to another embodiment. Timing diagram 610 illustrates a two part shared control in which four types of data control messages are received: those addressed to this device 602 and those not addressed to this device 605 which contain demodulation parameters necessary to properly demodulate the subsequent associated packet data channel, hereinafter referred to as part 1, those addressed to this device 607 and those not addressed to this device 609 which contain decoding and combining parameters needed to properly process the received data symbols, hereinafter referred to as part 2. Timing diagram 620 depicts three types of received data packets: a data packet with lower performance processing requirements 612, a data packet with higher performance processing requirements 615 and a data packet not addressed to this device which does not need to be processed at all 617. Timing diagram 630 illustrates the timing of processing for the shared control channel in which part 1 of both control messages addressed to this device are processed 622 and control messages not addressed to this device are at least attempted to be processed 627. Only when a successful decode of part 1 occurs or under marginal signal conditions is part 2 decode attempted 625. Timing diagram 640 illustrates the processing of the subsequent packet data channel based on the extracted parameters from the associated control channel messages 622 and 625. These decoding parameters convey, in this example, lower processing requirements for certain data packets 632 and higher processing requirements for others 635.

Timing diagram 650 depicts the voltage scaling available to deliver the optimum performance/power tradeoff to process data packets 635 which require higher performance and in this example, higher voltage 655 while allowing the performance to remain low to process data packets 632 which require lower performance with lower voltage 657. Likewise, timing diagram 660 shows the corresponding frequency adjustments with a higher frequency 665 enabled by the corresponding higher voltage 655 and inversely, the lower frequency 667 which in turn allows the voltage to be lowered 657 to match the lower performance requirements. The net result is shown in timing diagram 670 which illustrates average power over time with highest power consumed during high performance periods when both frequency 665 and voltage 655 are elevated and lowest power 677 during low performance periods when both frequency 667 and voltage 657 can be reduced. While this figure illustrates changing frequency and voltage together every time, these need not be coupled and only two performance levels are shown here for simplicity. An actual system may have more than two performance levels and multiple combinations The method and device of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A wireless communication device comprising:
   a housing;
   a controller coupled to the housing, the controller configured to control the operations of the wireless communication device;
   memory coupled to the controller;
   a transceiver coupled to the controller, the transceiver configured to send and receive wireless signals;
   the receive signal includes at least a control channel and a packet data channel, the control channel being configured to provide the modulation and encoding and/or decoding information necessary to process a subsequent packet of data received by the transceiver or in preparation for transmission by the transceiver;
   a monitoring module for monitoring the control channel and controlling a dynamic scaling module, the monitoring module reads a parameter field from the control channel which is used to determine that the data message has certain processing needs meeting a certain threshold;
   the dynamic scaling module configured to provide energy savings by varying the voltage and frequency of a controller, substantially real-time, according to the processing needs determined by the monitoring module, including: (i) a performance mode including a performance voltage and performance frequency when the certain threshold is met; and (ii) a default mode including a default voltage and default frequency when the certain threshold is not met.

2. The wireless communication device of claim 1, wherein the control channel provides at least one of a plurality of parameters required to demodulate, decode and combine subsequent packet data information and a plurality of parameters required to prepare subsequent packet data for transmission.

3. The wireless communication device of claim 2, wherein the plurality of parameters includes at least one of data regarding despreading, modulation type, redundancy information, ARQ processing number and transmission/retransmission indication and data regarding transmit power and time allocation.

4. The wireless communication device of claim 2, wherein the packet data channel is processed based on a received plurality of parameters on an associated control channel.

5. The wireless communication device of claim 1, wherein the transceiver is configured to send and receive wireless signals communicating with packet data.

6. The wireless communication device of claim 1, wherein the transceiver is configured to send and receive wireless signals including at least one of WCDMA, HSDPA, 3GPP Long Term Evolution, WiMAX, GPRS, EDGE and GSM.

7. The wireless communication device of claim 1, wherein the performance mode includes operating voltages sufficient to process control channels with high throughput packet data channels and frequencies necessary to meet high performance requirements.

8. The wireless communication device of claim 1, wherein the certain threshold is configured to allow the controller to process certain streaming audio and video bursts in the default mode.

9. The wireless communication device of claim 1, wherein the dynamic scaling module includes at least a third mode including a third voltage and third frequency when a predetermined threshold is met.

10. The wireless communication device of claim 1, the dynamic scaling module remains in at least one of the performance mode and default mode for at least two successive parameter field readings before switching.

11. A wireless communication method, comprising:
    providing a wireless communication device configured to send and receive wireless signals, the receive signal includes at least a control channel and a packet data channel, the control channel being configured to provide the modulation and decoding information necessary to process a subsequent packet of data received by, or being prepared for transmission by, the wireless communication device, the wireless communication device further including a controller;
    reading a parameter field from the control channel to determine whether the data message has certain processing needs meeting a certain threshold;
    dynamically scaling voltage and frequency of at least the controller, in response to the reading step, by providing: (i) a performance mode including a performance voltage and performance frequency when the certain threshold is met; and (ii) a default mode including a default voltage and default frequency when the certain threshold is not met.

12. The wireless communication method of claim 11, wherein the dynamic scaling step includes remaining in at least one of the performance mode and default mode for at least two successive readings of the parameter field before switching.

13. The wireless communication method of claim 11, wherein the reading step includes providing at least one of a plurality of parameters for demodulating, decoding and combining subsequent packet data channels and a plurality of parameters for preparing subsequent packet data for transmission.

14. The wireless communication method of claim 11, wherein the reading step includes providing at least one of a plurality of parameters for despreading, modulating, redundancy, ARQ processing and transmission or retransmission and a plurality of parameters for transmit power and time allocation.

15. The wireless communication method of claim 11, wherein the providing step further includes providing a transceiver configured to send and receive wireless signals including at least one of WCDMA, HSDPA, 3GPP Long Term Evolution, WiMAX, GPRS, EDGE and GSM.

16. The wireless communication method of claim 11, wherein the performance mode includes operating voltages sufficient to process control channels with high throughput packet data channels and frequencies necessary to meet high performance requirements.

17. The wireless communication method of claim 11, wherein the certain threshold is configured to allow the controller to process certain streaming audio and video in the default mode.

18. The wireless communication method of claim 11, wherein the performance mode defines a first mode and the default mode defines a second mode and the dynamic scaling step includes, providing a third mode including a third voltage and third frequency when a third predetermined threshold is met.

19. The wireless communication method of claim 11, wherein the dynamic scaling step includes remaining in at least one of the performance mode and default mode for at least two successive parameter field readings before switching.

* * * * *